United States Patent
Chuang et al.

(10) Patent No.: US 7,097,342 B2
(45) Date of Patent: Aug. 29, 2006

(54) HOUSING FOR A BACKLIGHT MODULE AND BACKLIGHT MODULE USING THE SAME

(75) Inventors: Yung-Ping Chuang, Tao Yuan Shien (TW); Keng-Ju Liu, Tao Yuan Shien (TW); Chun-Chi Hsu, Tao Yuan Shien (TW); Bing-Han Tsai, Tao Yuan Shien (TW); Mao-Wei Lin, Tao Yuan Shien (TW); Szu-Han Li, Tao Yuan Shien (TW); Li-Hwang Lu, Tao Yuan Shien (TW); Deng-Kuen Shiau, Tao Yuan Shien (TW); Chun-Ming Chen, Tao Yuan Shien (TW); Chun-Chien Chu, Tao Yuan Shien (TW)

(73) Assignee: Quanta Display Inc., (TW)

( * ) Notice: Subject to any disclaimer, the term of this patent is extended or adjusted under 35 U.S.C. 154(b) by 81 days.

(21) Appl. No.: 10/841,456

(22) Filed: May 10, 2004

(65) Prior Publication Data

US 2005/0157520 A1    Jul. 21, 2005

(30) Foreign Application Priority Data

Jan. 16, 2004    (TW) ............................... 93101271 A

(51) Int. Cl.
*F21V 8/00* (2006.01)
(52) U.S. Cl. ..................................... 362/632; 362/561
(58) Field of Classification Search ............... 362/632, 362/633, 634, 561, 511, 310, 330, 390, 26; 349/58
See application file for complete search history.

(56) References Cited

U.S. PATENT DOCUMENTS

| | | | |
|---|---|---|---|
| 6,773,127 B1 * | 8/2004 | Kao | 362/627 |
| 6,806,921 B1 * | 10/2004 | Nishida et al. | 349/58 |
| 2005/0078469 A1 * | 4/2005 | Jeong | 362/31 |

* cited by examiner

*Primary Examiner*—Sharon Payne
(74) *Attorney, Agent, or Firm*—Bacon & Thomas PLLC

(57) ABSTRACT

A housing for a backlight module is disclosed. The housing has a bottom casing and a side frame for holding a lighting unit, a light guide plate having a protrusion, and optionally a plurality of optical sheets. In particular, an indentation part is formed on the side frame for holding the protrusion, and a slit with unequal width is formed adjacent to the indentation part. A backlight module using the above-mentioned housing is also disclosed therewith.

17 Claims, 3 Drawing Sheets

HOUSING FOR A BACKLIGHT MODULE AND BACKLIGHT MODULE USING THE SAME

BACKGROUND OF THE INVENTION

1. Field of the Invention

The present invention relates to a backlight module of a liquid crystal display and, said backlight module having indentation part to absorb shock or import energy and to prevent the light guide plate from cracking.

2. Description of Related Art

Generally, the precision electronics products have to pass some basic inspections before they enter the market so as to guarantee an acceptable extent of product quality as well as rights and interests of consumers. This is of course also true for notebook computers. Every notebook manufacturer certainly has a matured system of quality control in the production and inspection of devices so that the quality control can be implemented thoroughly. In particular, in the circumstance of a vigorously competitive market, the manufacturers tend to manifest the reliability of products by drawing up strict inspection criteria in order to gain the market identification. Therefore, each notebook computer has to pass a complete set of tests including those for endurance to shock and pressure, the opening and closing lifetime of the screen, high and low temperature environment, electric wave affection, static environment, severe operation, etc. Among the tests above-mentioned, the shock test is aimed to inspect the impact resistance of the interior of the notebook. By dropping the notebook vertically to a metal platform, the shock test can test the antishock capability of the notebook. In the shock test, strict scrutiny of the antishock capability of both the notebook body and the liquid crystal display device is carried out.

In the early stages of notebook computer testing, the requirement of shock endurance was comparatively low with respect to current criteria, hence the backlight module could pass the shock test without need for further refinement. However, more exacting standards developed since then have resulted in the lamp of the backlight module of the liquid crystal display device often breaking due to the impact of the light guide plate during the shock test. Thus, the original design of the backlight module can no longer pass the shock test. Therefore, current light guide plates are modified to have a pair of protrusions, which can be held by the corresponding indentation parts formed on the frame in order to prevent the light guide plate from impacting on the lamp. The trend of notebook computers to become increasingly compact has resulted in the need for the liquid crystal display devices to be made thinner. Hence, the thickness of the light guide plate of the backlight module, is correspondingly reduced. Simultaneously, the shock endurance testing for the notebook computer has become even stricter. Consequently, the thinned light guide plate with lower mechanical strength cannot endure that strong impact and, particularly, often cracks at the root of protrusions. The high scrap rate of the light guide plate is an economic burden for the manufacturers. Therefore, it was proposed in USP20030043312 to form a damping slit adjacent to the indentation part, as shown in FIG. 3. Because the lamp is located below the housing 100, a slit 120 with equal width is formed below the indentation part 110 of the housing 100 so that the structure strength around the indentation part 110 of the side frame is weakened, a buffer space for the deformation of the protrusion 130 caused by the impact of the light guide plate is provided, and the impact force can therefore be decreased. However, the width of the slot 120 is limited and must be less than the distance between the light guide plate and the lamp in order to mitigate the impact effectively and certainly prevent the lamp from being impacted by the light guide plate. However, in order to reduce the volume of the liquid crystal display device and enhance the lighting efficiency, the distance between the light guide plate and the lamp has become very short, so it is quite difficult in practice to make a mold for manufacturing such a narrow slit. Even though the mold can be made successfully, the lifetime of the mold is still very short because the structure strength of a narrow slit is weak and it can't endure a plastic injection process too many times, and thus again, overall manufacturing costs are too high.

Therefore, it is desirable to provide a housing for a backlight module and a backlight module using the same to mitigate and/or obviate the aforementioned problems.

SUMMARY OF THE INVENTION

The object of the present invention is to provide a backlight module of a LCD so that the shock endurance of the backlight module is improved; the light guide plate of the backlight module are not easily broken; the housing of the backlight module and the mold for making the housing are manufactured easily; and the lifetime of the mold is extended.

Another object of the present invention is to provide a housing for a backlight module of a LCD so that the impact force on the light guide plate is damped effectively; the light guide plate of the backlight module are prevented from breaking; the housing of the backlight module and the mold for making the housing are manufactured easily; and the lifetime of the mold is extended.

To achieve the object, the backlight module of the present invention includes a lighting unit having a light source and a reflective sheet for providing a light beam; a light guide plate having at least one protrusion at a periphery of the light guide plate and being adjacent to the lighting unit for receiving and reflecting the light beam; and a housing having a bottom casing and at least one side frame for holding the lighting unit and the light guide plate. The side frame is mounted on a periphery of the bottom casing, an indentation part corresponding to the protrusion of the light guide plate is formed on the side frame for holding the protrusion, and a slit with unequal width is formed adjacent to the indentation part.

To achieve the object, the housing for a backlight module of the present invention includes a bottom casing; and at least one side frame mounted on the periphery of the bottom casing. In particular, an indentation part is formed on the side frame, and a slit with unequal width is formed adjacent to the indentation part.

The width or the sectional shape of the slit of the housing for a backlight module of the present invention is not specifically limited. Preferably, the width of one end of the slit near the light guide plate is not equal to the width of the other end of the slit, or the width of the upper part of the slit is not equal to the width of the lower part of the slit. More preferably, the width of one end of the slit near the light guide plate is shorter than the width of the other end of the slit, or the width of the upper part of the slit is shorter than the width of the lower part of the slit. Moreover, the slit of the housing for a backlight module of the present invention is preferably located between the indentation part and the lighting unit for damping the impact force, and the narrowest width of the slit is preferably shorter than the distance between the light guide plate and the lighting unit so as to prevent the light guide plate from impacting on the lighting unit. The shape of the slit of the present invention can be any shape that is easily molded through injection. Preferably, the ratio of the depth of the slit to the narrowest width of the slit is less than 20:1. More preferably, the sectional shape of the slit is a trapezoid. Preferably, the backlight module of the present invention further includes a plurality of optical sheets located adjacent to the light guide plate but out of the alignment between the lighting unit and the light guide plate for making the light beam uniform. More preferably, the optical sheets are diffusing sheets, or prism sheets. The housing for a backlight module of the present invention can be made of any conventional materials. Preferably, the housing of the present invention is made of plastics or metals.

Other objects, advantages, and novel features of the invention will become more apparent from the following detailed description when taken in conjunction with the accompanying drawings.

DETAILED DESCRIPTION OF THE PREFERRED EMBODIMENT

Embodiment 1

Figure 1:
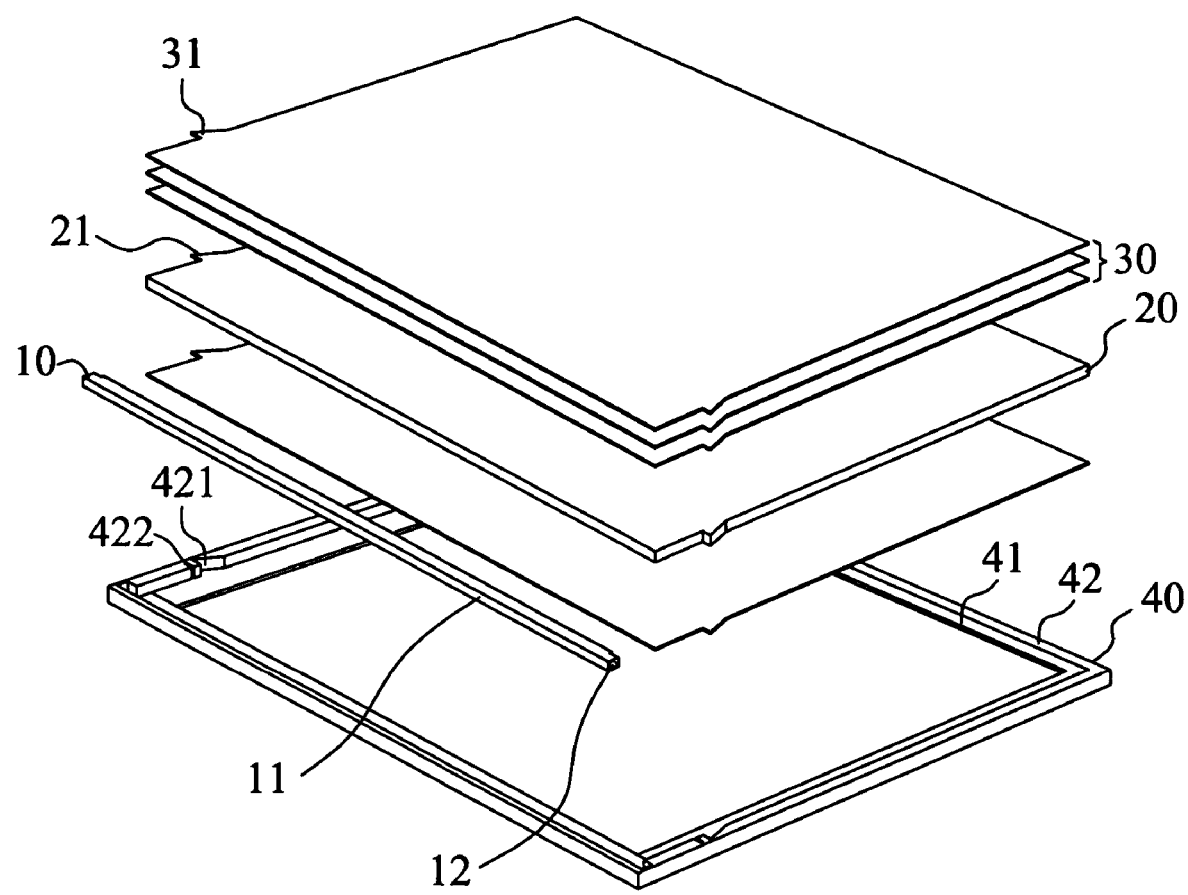
FIG. 1 is an exploded perspective view of the backlight module of the present invention.
Figure 2A:
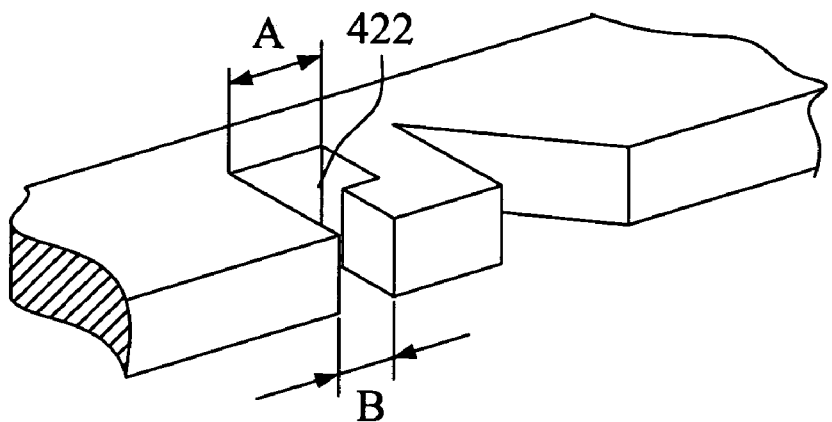
FIGS. 2a~2c are perspective views showing the preferred embodiments of the side frame of the present invention.

With reference to FIG. 1, there is shown an exploded perspective view of the backlight module of the present invention. The backlight module of the present invention has a lighting unit 10, a light guide plate 20, a plurality of optical sheets 30, and a housing 40. The lighting unit 10 is composed of a reflective sheet 11 and a light source 12. The light source 12 emits a light beam, which is subsequently reflected by the reflective sheet 11 and enters the light guide plate 10. The light guide plate 20 and the optical sheets 30 can make the light beam uniform so as to provide the liquid crystal panel with uniform plane illumination light rays. Moreover, the optical sheets 30 include, for example, a diffusing sheet, or a prism sheet. The light guide plate 20 and the optical sheets 30 respectively have a pair of protrusions 21 and 31 at their side edges that are vertical to the lighting unit 10. Further, the housing 40 is composed of a bottom casing 41 and a side frame 42 for holding the lighting unit 10, the light guide plate 20, and the optical sheets 30. Besides, the side frame 42 is formed on the periphery of the bottom casing 41. Furthermore, an indentation part 421 is formed on the side frame 42 to hold the protrusions 21, 31. In particular, a slit 422 with unequal width (the slit 422 having a width that varies from a wide part to a narrow part) is formed adjacent to the indentation part 421. A variety of designs for the slit 422 may be provided. In the present embodiment, the slit 422 has a longer width A at its interior, as shown in FIG. 2a. Therefore, the mold used can be made, for example, from a hexahedron with a width A. Afterwards, the root of the hexahedron is processed to have a width B, wherein the process method thereof can be electrical discharge machining or general grinding machining. Therefore, the processing of the mold is without complication, and the mold can have an extended lifetime because it has stronger structure strength than a narrow slit. In addition to that, as long as the width B is shorter than the distance between the light guide plate 20 and the lighting unit 10, the light guide plate can be prevented from impacting on the light source.

Embodiment 2

Figure 2B:
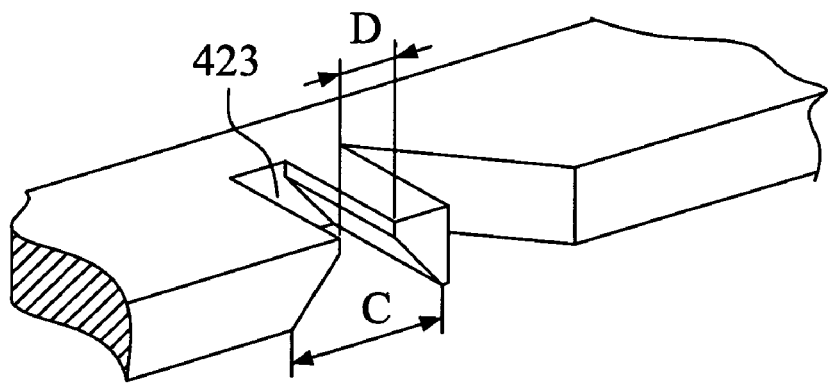

As shown in FIG. 2b, the construction of the present embodiment is very similar to that of Embodiment 1, except that the lower the position of the segment of the slit 423 is, the longer the width of the segment becomes. Hence, the mold used can be made, for example, from a hexahedron with a width C. Afterwards, the upper of the hexahedron is processed to have a width D, and both the shoulders are cut thereafter. Also, the processing method aforesaid can be electrical discharge machining or general grinding machining. Therefore, the process of the mold is without complication, and the mold can have an extended lifetime because it has stronger structure strength than a narrow slit. In addition to that, as long as the width D is shorter than the distance between the light guide plate 20 and the lighting unit 10, the light guide plate can be prevented from impacting on the light source.

Embodiment 3

Figure 2C:
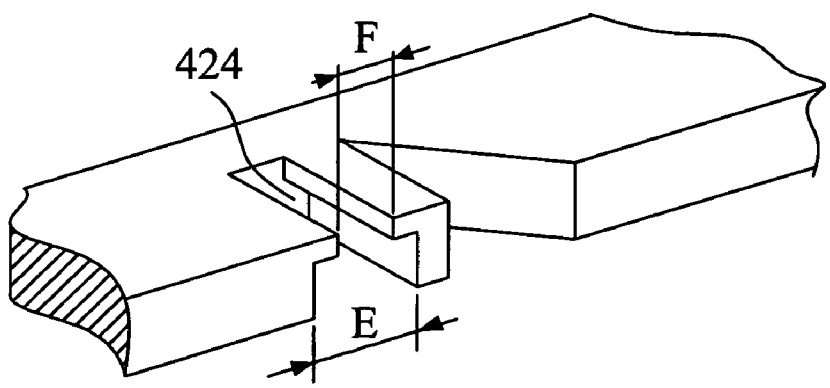
Figure 3:
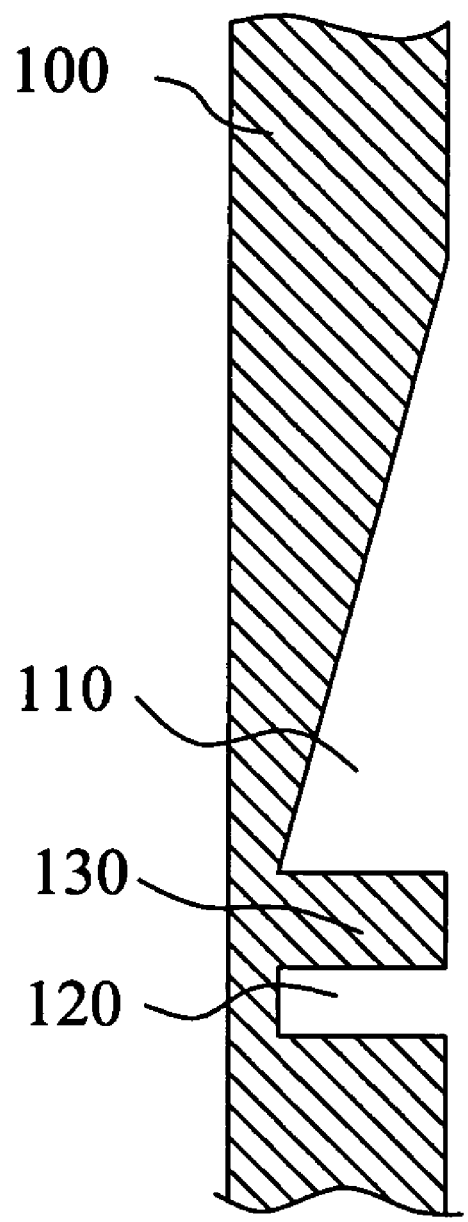
FIG. 3 is a cross-section view showing the side frame of the prior art.

As shown in FIG. 2c, the construction of the present embodiment is very similar to that of Embodiment 1, except that the width of the lower part of the slit 424 is longer than that of the upper part of the slit 424. Hence, the mold used can be made, for example, from a hexahedron with a width E, and then the upper of the hexahedron is processed to have a width F. Similarly, the process method aforesaid can be electrical discharge machining or general grinding machining. Therefore, the process of the mold is without complication, and the mold can have an extended lifetime because it has stronger structure strength than a narrow slit. In addition to that, as long as the width F is shorter than the distance between the light guide plate 20 and the lighting unit 10, the light guide plate can thus be prevented from impacting on the light source.

When a notebook using the liquid crystal display device that mounts the backlight module having the housing of the present invention undergoes the shock test, the cantilever beam sandwiched between the indentation part 421 and the slit 422, 423, or 424 will deform temporarily, and the impact force exerted on the light guide plate or the optical sheets can be mitigated effectively. Thus, the light guide plate and the optical sheets are prevented from breaking. Also, the slit 422, 423, or 424 can provide a buffer space for the deformation of the cantilever beam, and the light guide plate and the optical sheets can be blocked effectively from impacting on the light source. Moreover, the mold for producing the slit 422, 423, or 424 of the present invention can be constructed easily, and the detailed adjustment of the mold becomes possible. Consequently, the mold has a durable structure and, therefore, has an extended lifetime.

Although the present invention has been explained in relation to its preferred embodiment, it is to be understood that many other possible modifications and variations can be made without departing from the spirit and scope of the invention as hereinafter claimed.

What is claimed is:

1. A backlight module comprising:
    a lighting unit having a light source and a reflective sheet for providing a light beam;

a light guide plate having at least one protrusion at a periphery of the light guide plate and being adjacent to the lighting unit for receiving and reflecting the light beam; and a housing having a bottom casing with a periphery and a plurality of side frames for holding the lighting unit and the light guide plate, wherein the side frames are formed on the periphery of the bottom casing, at least one indentation part corresponding to the at least one protrusion of the light guide plate is formed on at least one of said side frames for holding said at least one protrusion, and a slit is formed adjacent to each indentation part, the slit having a width that varies from a wide part to a narrow part.

2. The backlight module as claimed in claim 1, wherein the width of one end of the slit near the light guide plate is not equal to the width of the other end of the slit.

3. The backlight module as claimed in claim 1, wherein the width of an upper part of the slit is not equal to the width of a lower part of the slit.

4. The backlight module as claimed in claim 1, wherein the slit is located between the indentation part and the lighting unit.

5. The backlight module as claimed in claim 1, wherein a narrowest width of the slit is shorter than the distance between the light guide plate and the lighting unit.

6. The backlight module as claimed in claim 1, wherein the width of one end of the slit near the light guide plate is shorter than the width of the other end of the slit.

7. The backlight module as claimed in claim 1, wherein the width of an upper part of the slit is shorter than the width of a lower part of the slit.

8. The backlight module as claimed in claim 1, wherein the ratio of a depth of the slit to a narrowest width of the slit is less than 20.

9. The backlight module as claimed in claim 1, wherein the housing is made of plastics or metals.

10. A housing structure for a backlight module comprising:

a bottom casing with a periphery; and a plurality of side frames formed on the periphery of the bottom casing, wherein an indentation part is formed on at least one of said side frames, and a slit is formed adjacent to the indentation part, the slit having a width that varies from a wide part to a narrow part.

11. The housing structure for a backlight module as claimed in claim 10, wherein the indentation is used to hold a protrusion of a light guide plate.

12. The housing structure for a backlight module as claimed in claim 10, wherein the width of one end of the slit near a light guide plate is not equal to the width of the other end of the slit.

13. The housing structure for a backlight module as claimed in claim 10, wherein the width of one end of the slit near a light guide plate is shorter than the width of the other end of the slit.

14. The housing structure for a backlight module as claimed in claim 10, wherein the width of an upper part of the slit is not equal to the width of a lower part of the slit.

15. The housing structure for a backlight module as claimed in claim 10, wherein the width of an upper part of the slit is shorter than the width of a lower part of the slit.

16. The housing structure for a backlight module as claimed in claim 10, wherein the ratio of a depth of the slit to a narrowest width of the slit is less than 20.

17. The housing structure for a backlight module as claimed in claim 10, wherein the bottom casing and the side frame are made of plastics or metals.

* * * * *